United States Patent
Lin et al.

(10) Patent No.: US 7,254,134 B2
(45) Date of Patent: Aug. 7, 2007

(54) SYSTEMS FOR TRANSFERRING VARIOUS DATA TYPES ACROSS AN ATM NETWORK

(75) Inventors: Jung-Lung Lin, Holmdel, NJ (US);
Virender Yadav, Parlin, NJ (US);
Pramrod Kaluskar, Islin, NJ (US);
Vidyadhar Vadapalli, Islin, NJ (US);
Leon Paley, East Brunswick, NJ (US);
Ravi Lambi, Woodbridge, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 0 days.

(21) Appl. No.: 11/534,760

(22) Filed: Sep. 25, 2006

(65) Prior Publication Data
US 2007/0025361 A1    Feb. 1, 2007

Related U.S. Application Data

(63) Continuation of application No. 10/094,931, filed on Mar. 11, 2002.

(60) Provisional application No. 60/274,883, filed on Mar. 9, 2001.

(51) Int. Cl.
*H04L 12/28* (2006.01)

(52) U.S. Cl. .................................. 370/395.1

(58) Field of Classification Search ................ 370/351, 370/395.1, 395.5, 395.6–1, 395.63–5, 466, 370/467, 353, 356
See application file for complete search history.

(56) References Cited

U.S. PATENT DOCUMENTS

| 2003/0099254 A1 | 5/2003 | Richter |
| 2003/0210697 A1 | 11/2003 | Mercier |
| 2005/0201387 A1 | 9/2005 | Willis |

*Primary Examiner*—Doris H. To
*Assistant Examiner*—Kerri M Rose
(74) *Attorney, Agent, or Firm*—Thomas, Kayden, Horstemeyer & Risley, LLP

(57) ABSTRACT

Methods, systems, processing units, and signals for transferring data of various data types across a common data path interface are disclosed. A representative method for transferring data between a master processing unit and at least a first slave processing unit via a common data path interface, the master processing unit and the at least first slave processing unit are configured to process a plurality of non-Asynchronous Transfer Mode (ATM) data types, includes: receiving the data; generating an ATM cell in an ATM cell format determined from a plurality of ATM cell formats; transferring the ATM cell across the common data path interface to an appropriate processing unit; and processing the ATM cell upon receiving it from the common data path interface.

23 Claims, 9 Drawing Sheets

SYSTEMS FOR TRANSFERRING VARIOUS DATA TYPES ACROSS AN ATM NETWORK

CROSS-REFERENCE TO RELATED APPLICATION

This application is a continuation of U.S. patent application Ser. No. 10/094,931, filed on Mar. 11, 2002, which claimed the benefit of U.S. Provisional Application, Ser. No. 60/274,883, filed on Mar. 9, 2001 and entitled "Pseudo ATM Cell for Packet and PCM Solution," which is incorporated by reference herein in its entirety.

FIELD OF THE INVENTION

The present invention generally relates to data and voice communication. More specifically, the invention relates to transferring data of various data types in Asynchronous Transfer Mode (ATM) communications.

BACKGROUND OF THE INVENTION

Today's telecommunication networks are characterized by specialization. This means that for every individual telecommunication service, at least one network exists that transports this service. Each of these networks was specially designed for that specific service and is often not applicable to transport another service. For example, advances in audio, video, and speech coding in compression algorithms in VLSI technology influenced the bit rate generated by a service, and thus changed the service requirements for the network. In addition, resources that are available in one network, generally are not available for other networks. Thus, the need for a service-independent network is evident based upon these disadvantages from existing networks. Asynchronous Transfer Mode (ATM) is a communication protocol for use in a service independent network. With ATM, information for multiple service types, such as voice, video or data is conveyed in small, fixed-size cells. ATM technology combines the benefits of circuit switching (guaranteed capacity and constant transmission delay) with the benefits of packet switching (flexibility and efficiency for intermittent traffic). ATM technology provides a scalable bandwidth from a few megabits per second (Mbps) to many gigabits per second (Gbps). Because of its asynchronous nature, ATM is more efficient than synchronous technologies, such as time-division multiplexing (TDM).

ATM transfers information in fixed-sized units called cells. Each cell contains 53 bytes. FIG. 1 is a schematic of a standard ATM cell 10 format as defined by the ATM Forum and the International Telecommunications Union's Telecommunication Standardization Sector (ITU-T). ATM cell 10 contains a five-byte header 11, which contains all of the information necessary for network management. ATM cell 10 also contains a payload 13, which is the remaining 48 bytes.

ATM header 11 has a different format depending on whether it is UNI or NNI. The ATM header 11 of FIG. 1 is configured for UNI. For byte 1, bits 8-5 correspond to the Generic Flow Control (GFC) field. The GFC field allows a multiplexer to control the rate of an ATM terminal. The GFC can be used to provide local functions, such as flow control at the UNI. These bits are not carried end-to-end and may be overwritten by local switches. However, the GFC field is typically not used and is set to a default value.

The next 8 bits (bits 4-1 of byte 1 and bits 8-5 of byte 2) correspond to the Virtual Path Identifier (VPI) field. VPI is used in conjunction with the Virtual Channel Identifier (VCI), to identify the next destination of a cell as it passes through a series of ATM switches on the way to its destination. The next 16 bits of ATM header 11 represent the VCI. Like the VPI, the VCI is used to identify the next destination of a cell as it passes through a series of ATM switches on the way to its destination.

The next 3 bits (bits 4-2 of byte 4) correspond to the Payload Type Indicator (PTI) field. The first PTI bit indicates whether the ATM cell 10 contains user data or control data. If the cell 10 contains user data, the second PTI bit indicates congestion, and the third PTI bit indicates ATM user to ATM user information, typically used to indicate the end of an ATM adaptation layer 5 (AAL5) frame. A single bit following the PTI corresponds to the Cell Loss Priority (CLP). CLP bit indicates whether the cell should be discarded if it encounters congestion as it moves through the network. If the CLP bit equals one, then the cell should be discarded in preference to cells with the CLP bit equal to zero. The final 8 bits, which are in byte 5, correspond to the Header Error Control (HEC). The HEC bits are a checksum calculated on the header 11 itself.

The NNI header format varies slightly from the UNI header format described above. The difference lies in the fact that the GFC field, as discussed above in the UNI header format 11, is not present in the NNI header format. Instead, the VPI field occupies the first 12 bits of header 11. This allows the ATM switches to assign larger VPI values. With that sole exception, the NNI header is identical to the format of the UNI header 11.

An ATM switch generally has several inputs and several outputs that are carrying ATM data. The information in the header 11 carries the navigational information for each ATM cell 10 so that the ATM cell 10 is provided to the proper output. Each input and output can be said to be a physical layer device. The ATM switch includes resources that will process each cell 10 at a higher layer from the physical layer devices, the ATM layer. Once processed, each ATM cell 10 can be provided to the proper output physical layer device. The different layers are in reference to the International Standards Organization's Open Systems Interconnection (ISO-OSI) international standard. A data bus is typically used to transport the ATM cells from the ATM layer to several different physical layer devices. The Universal Test & Operations PHY Interface for ATM (UTOPIA) data path interface has become a standard for the data bus that transports the ATM cells. The current UTOPIA data path interface, or UTOPIA bus is typically only used for standard ATM cell transfer.

Data that is not processed into cells cannot be transferred via the UTOPIA bus. Processing the data into standard ATM cells might require the data to be carried through the entire ATM network, which may not be desirable. Instead separate data buses for each different type of data may be required. Each bus specifically designed for each type of data. For example, digitized voice data such as pulse code modulation (PCM) data typically requires a time division multiplexed (TDM) enabled bus. Another example is packet data, such as Ethernet data, which may require a specially designed bus, such as the Media Independent Interface (MII) bus. From a system design point of view, separate data buses may be very expensive and complicated. It would be desirable to transfer data of various data types across a single data bus, for example, the UTOPIA bus, so as to eliminate the need for multiple buses, without encapsulating packet and/or voice data into a standard ATM cell.

Accordingly, there is a need for improved methods and systems for transferring data of various non-ATM data types across a common data path interface without encapsulating packet data and/or voice data into standard ATM cells.

SUMMARY OF THE INVENTION

The present invention relates to improved methods, systems, and signals for transferring data of various non-ATM data types across a common data path interface. In this regard, a representative method for transferring data between a master processing unit and at least a first slave processing unit via a common data path interface, the master processing unit and the at least first slave processing unit being configured to process a plurality of non-Asynchronous Transfer Mode (ATM) data types, includes: receiving the data; generating an ATM cell in an ATM cell format determined from a plurality of ATM cell formats; transferring the ATM cell across the common data path interface to an appropriate processing unit; and processing the ATM cell upon receiving it from the common data path interface.

In another embodiment, a multi-media communication system includes a master processing unit configured to process non-ATM data of at least a first data type. The master processing unit is further configured to encapsulate the data into cells. The format of each cell is one of a plurality of cell formats. The system further includes at least a first slave processing unit configured to process the cells and a common data path interface communicatively coupled to the master processing unit and the at least first slave processing unit. The common data path interface is configured to transfer the cells between the master processing unit and the at least first slave processing unit.

Another embodiment may be interpreted as a signal embodied in a data cell carrying packet data. The data cell includes a payload portion for storing the packet data, the data being byte-oriented. The data cell also includes a header portion that includes a length field for indicating the amount of packet data stored in the payload portion, a start of frame field for indicating whether the data cell is the first cell or the last cell of a packet frame, a sequence number field for sequentially numbering the data cell with respect to other data cells in the packet frame, an error detection field for communicating errors, wherein the errors are detected in the packet data stored in the payload portion, and a mapping field for mapping the data cell to a packet channel number.

Another embodiment may be interpreted as a signal embodied in a data cell carrying voice data. The data cell includes a payload portion for storing data, the data being voice samples. The data cell also includes a header portion that includes a mapping field for mapping the data cell to a physical layer port, a sequence number field for sequentially numbering the data cell with respect to other cells, a frame amount field for defining the number of frames of voice data stored in the payload portion, and a time slot amount field for defining the number of time slots per frame stored in the payload.

Another embodiment may be interpreted as a signal embodied in a data cell carrying packet data. The data cell includes a payload portion for storing the packet data, the data being bit-oriented. The data cell also includes a header portion that includes an end-of-data field for indicating an end of data for a channel, a partial flag field for properly completing an incomplete byte with a portion of a predetermined flag pattern, and a mapping field for mapping the data cell to a packet channel number.

Yet another embodiment may be interpreted as a processing unit that includes means for processing data of a plurality of data types, means for encapsulating the data into cells, wherein the format of each cell is one of a plurality of cell formats, and means for providing the cells to at least a second processing unit via a common data path interface.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION

Figure 1:
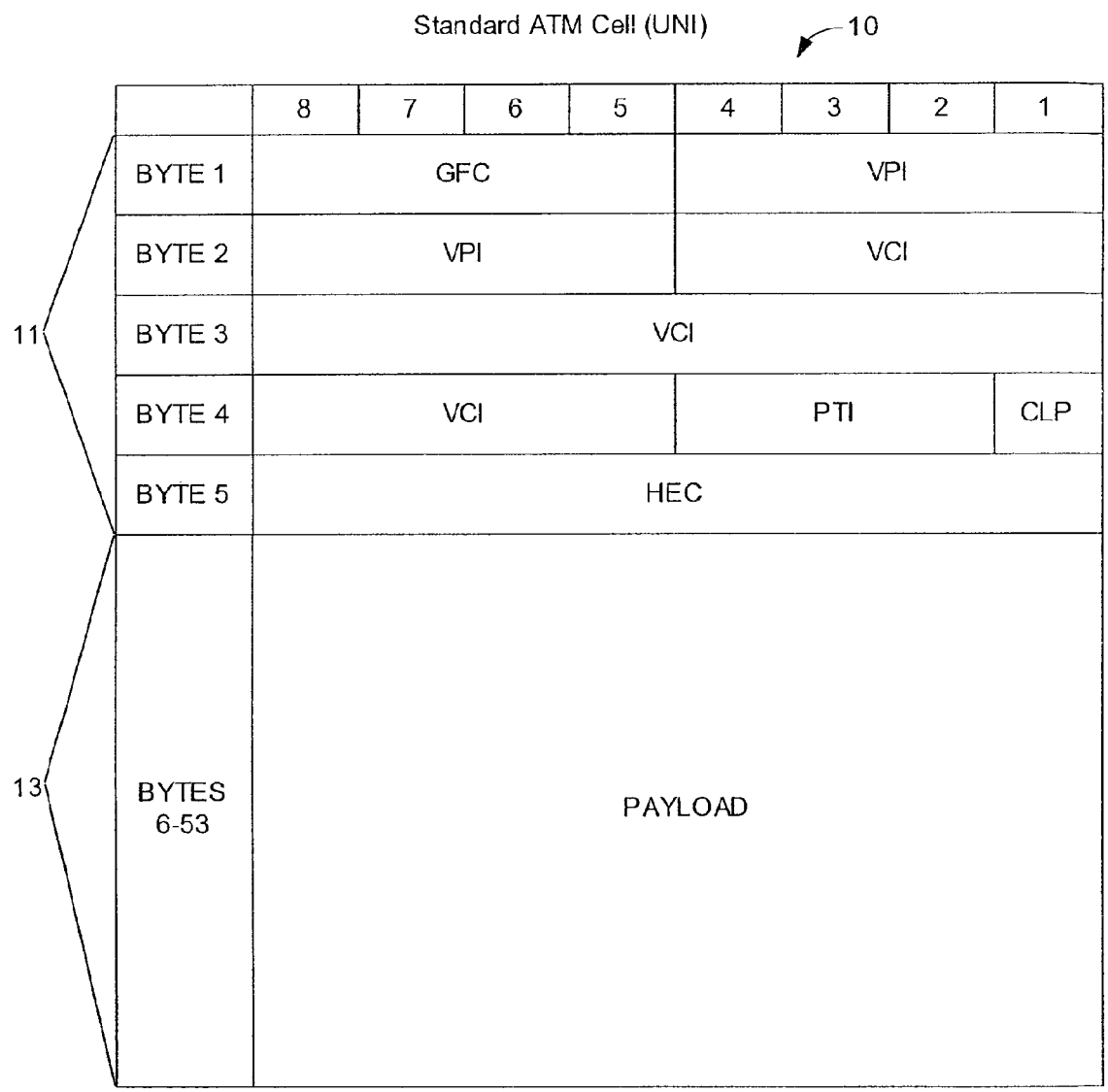
FIG. 1 is a prior art schematic of a standard ATM cell format as defined by the ATM Forum and the International Telecommunications Union's Telecommunication Standardization Sector (ITU-T).
Figure 2:
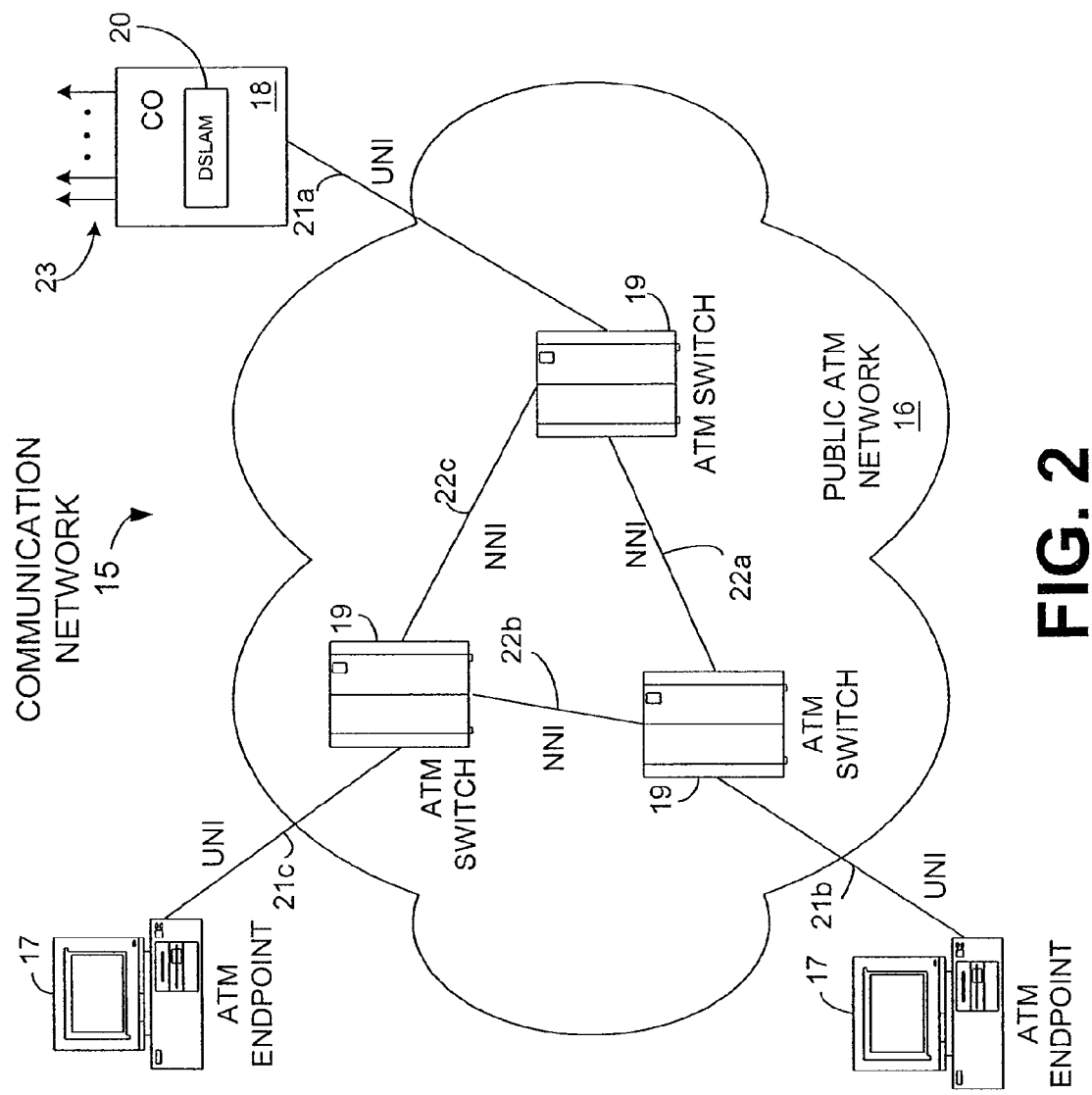
FIG. 2 is a block diagram of a standard ATM communication network in which embodiments of the present invention may be found.

Turning now to the drawings illustrating the present invention, wherein like reference numerals designate corresponding parts throughout the drawings, FIG. 2 is a block diagram of a standard ATM communication network 15 in which embodiments of the present invention may be found. ATM network 15 is made up of ATM endpoints 17 and ATM switches 19. Non-limiting examples of ATM endpoints 17 include workstations, routers, digital service units (DSUs), LAN switches, video coder/decoders (CODECs), and a Digital Subscriber Line Access multiplexer (DSLAM) 20. All of which may be located in a central office (CO) 18. In this particular example the DSLAM 20 is located in the CO 18. The ATM endpoint 17 contains an ATM network interface adapter (not shown). The ATM endpoint 17 communicates across the ATM network 16 via a plurality of ATM switches 19. The ATM switch 19 is responsible for cell transit through the ATM network 16. The ATM switch 19 accepts the incoming cell from an ATM endpoint 17 or other ATM switch 19, reads and updates the cell header information 11 (FIG. 1), and quickly switches the cell to an output interface toward its destination.

ATM switches 19 support two primary types of interfaces: User-to-Network Interface (UNI) and Network-to-Network Interface (NNI). The UNI connects ATM endpoints 17 to an ATM switch 19. As shown in FIG. 2, connections 21a, 21b, and 21c are UNI interfaces. The NNI connects to ATM switches 19. As shown in FIG. 2, connection 22a, 22b, and 22c are NNI connections.

A DSLAM 20 is a network device that may receive signals from multiple customer Digital Subscriber Line (DSL) connections 23 and puts the signals on a high-speed backbone line, such as UNI connection 21a, using multiplexing techniques. Depending on the product, DSLAM multiplexers may connect DSL lines with the public ATM network 16.

Embodiments of the present invention may be found in network devices such as the DSLAM 20, the ATM switch 19, and/or any type of ATM endpoint 17. Embodiments of the invention may be found in any device in which several processing units must communicate with each other, in particular ATM devices. In FIG. 2, a processing unit may be considered to be in each ATM switch 19 and/or ATM endpoint 17, or CO 18. A processing unit may be considered to be the interface to the CO 18 for the connection 21a and likewise interfaces for the connections 23.

Figure 3:
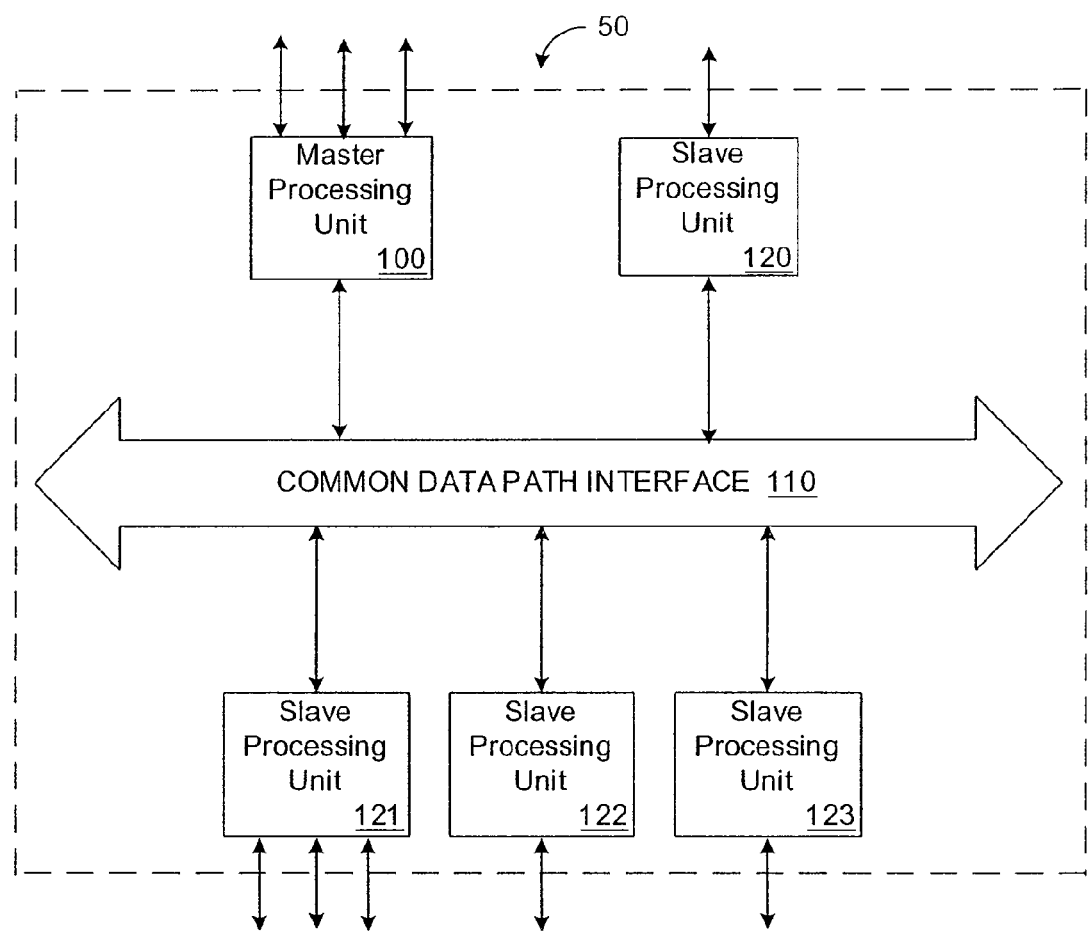
FIG. 3 is a block diagram illustrating a multi-media communication system in accordance with embodiments of the present invention.

FIG. 3 is a block diagram illustrating a multi-media communication system 50 in accordance with embodiments of the present invention. The multi-media communication system 50 of FIG. 3 includes a master processing unit 100 in communication with several slave processing units 120-123. The several processing units can communicate via a common data path interface 110. In this embodiment, the master processing unit 100 controls and facilitates all communication, the master processing unit 100 must facilitate communication between two slave processing units. In other embodiments, the system 50 may be configured in such a way that any slave processing unit can openly communicate with any other slave processing unit provided both are capable of doing so.

The master processing unit 100 of FIG. 3 shows that it can transmit and receive three different data streams as displayed in the three double-pointed arrows. The data streams may be of a great variety of data types. For instance, standard ATM data, packet data, and/or voice and signaling data. Other data types may be transmitted and received by the master processing unit 100 as well. The data streams may be coming from another location internal to the enclosed device or may be brought in from a foreign device.

Slave processing unit 120 can communicate with the master processing unit 100 via the common data path interface 110. FIG. 3 displays slave processing unit 120 with one input/output stream. One data type may be carried along this data stream, for instance, standard ATM data, packet data, or voice data. The appropriate resources must be incorporated within the slave processing unit 120 to process whatever data type is present. The appropriate resources will be discussed in relation to FIG. 4. Slave processing units 122 and 123 are similar to slave processing unit 120 in that each can process and communicate one data type. Each unit may process a different data type or at least two can process similar data types. Typically, a common data path interface is utilized for connecting many processing units to each other. In some instances, the master processing unit 100 may be considered the feeder end and the many slave processing units 120-123 may be considered the distribution end of a feeder/distribution network.

A slave processing unit may be configured to process and communicate more than one data stream of various data types (e.g. slave processing unit 121). The general resources required to perform this operation are included in both the master processing unit 100 and the slave processing unit 121.

The master processing unit 100 can simultaneously process data streams coming from several slave processing units at one time. It is important for the master processing unit 100 to know what slave processing unit 120-123 is sending what data across the common data path interface 110. Designated ports of the master processing unit 100 are assigned to particular slave processing units to distinguish the origination/destination of data. This will be discussed in further detail in relation to FIG. 4.

In operation, the multi-media communication system 50 is similar to a standard ATM system. A standard ATM system works in that a first standard ATM processing unit receives a data stream of standard ATM data already encapsulated in ATM cells. The first ATM processing unit reads the VPI and VCI of the ATM cell headers and provides each ATM cell to an appropriate processing unit based on the VPI and VCI via a common data path interface. A commonly used data path interface for ATM is a UTOPIA data path interface. Once the ATM cells are received by the appropriate processing unit, they are transmitted to their next destination in the network. Data transfer can occur in both an upstream and a downstream direction. The multi-media communication system 50 works in that a variety of data types, including standard ATM data, can be communicated across the common data path interface 110. A non-limiting example of various data types includes: standard ATM data, call control signaling data, PCM data, and various packet data types, such as Internet Protocol (IP) data, High-level Data Link Control (HDLC) data, and Ethernet data. The master processing unit 100 may have the resources to process some or all of these types of data. Individual slave processing units may have the resources to process some or all of these data types. Several new ATM cell formats that will be discussed in figures that follow can facilitate the transfer of these various data types across the common data path interface 110.

The multi-media communication system 50 may be incorporated into many different levels of communications systems. The multi-media communication system 50 may be incorporated within the communication network 15 of FIG. 2 or may be incorporated within the DSLAM 20. If the system 50 was incorporated within the network 15, the different ATM switches 19 and endpoints 17 may be considered the processing units. In this case however, generally, only non-voice data may be communicated. This is because of the lack of timing information transferred for voice data which is generally required for transferring voice samples across relatively long distances. More typically, though, the system 50 would be incorporated into a network device similar to the DSLAM 20. The processing units 100, 120-123 of FIG. 3 would be different interfaces for corresponding communication mediums. For example, the master processing unit 100 may be the interface for the UNI connection 21a as well as other mediums not shown. The slave processing units 120-123 may be the interfaces for different DSL lines.

In other embodiments, the processing units may be communication line cards located on a rack or the processing units may be different chip sets attempting to communicate with each other via the common data path interface. Similarly, the processing units may be microchips attempting to communicate with each other. More likely than all of these examples, though, is the system 50 may be incorporated into components within the microchips. The system 50 and its corresponding processing units can be scaled in such a way so that communication can be provided for on different levels of complexity and connectivity.

Figure 4:
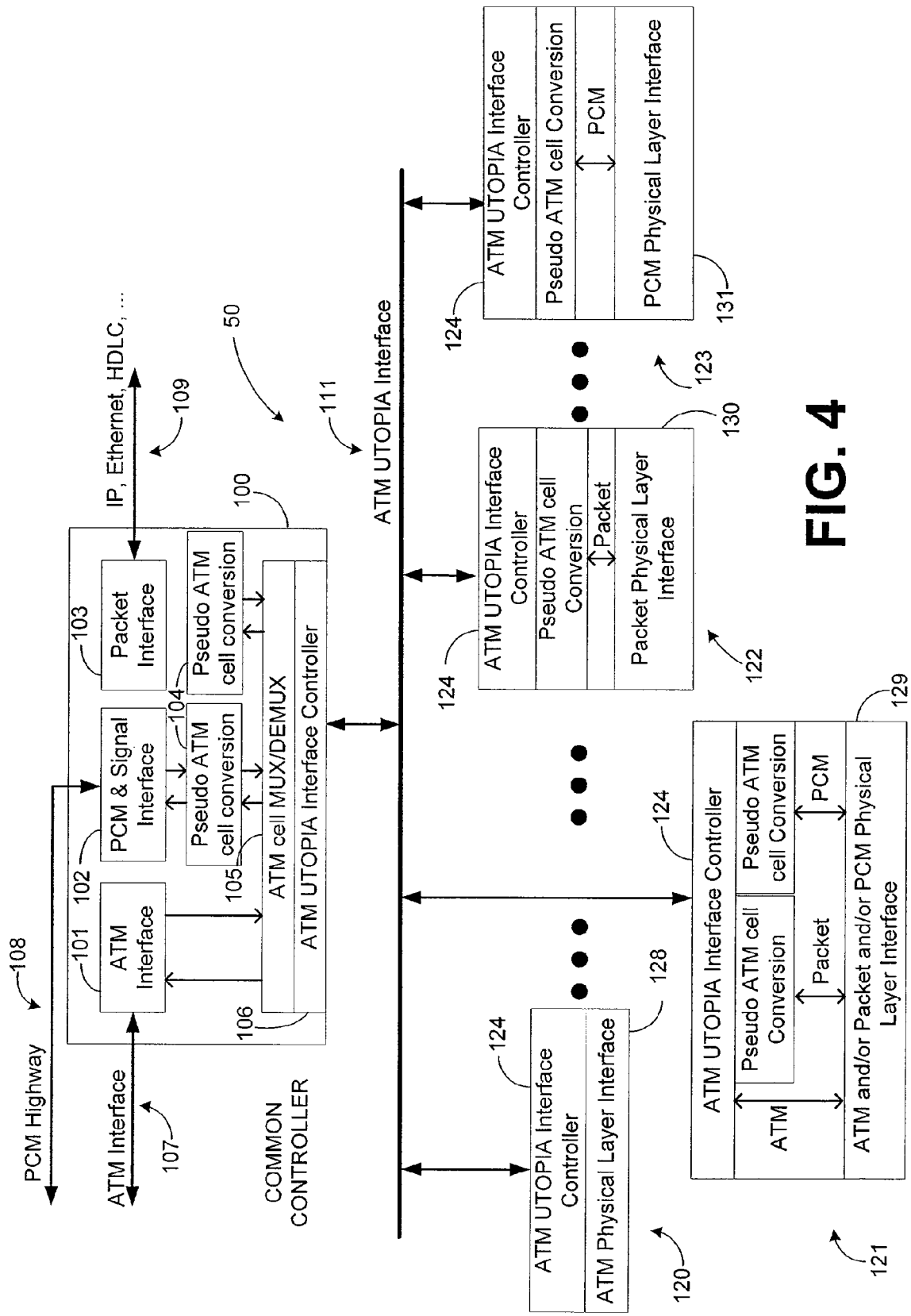
FIG. 4 is a block diagram illustrating the multi-media communication system of FIG. 3 in greater detail.

FIG. 4 is a block diagram illustrating the multi-media communication system 50 of FIG. 3 in greater detail. In this figure the master processing unit 100 has been termed the common controller 100. These terms have been used interchangeably. In this embodiment, an ATM UTOPIA interface or bus 111 has been utilized for a common data path interface 110. The UTOPIA interface 111 is one type of common data path interface that can be utilized. Other data path interfaces and the accompanying processing units may be configured to be utilized similarly.

In this embodiment, the master processing unit 100 may be configured to process and transfer standard ATM data, PCM & call control signaling data, and packet data. ATM slave processing unit 120 may be configured to process the standard ATM data. Slave processing unit 121 may be configured to process all the types of data. Packet slave processing unit 122 may be configured to process the packet data and PCM slave processing unit 123 may be configured to process the PCM and call control signaling data. It should be noted that although PCM and call control signaling data are discussed in this embodiment, after digitized voice data could be communicated in much the same manner. It is not intended for this to be a limiting example.

The master processing unit 100 includes an ATM interface 101, a PCM & Signal interface 102, and a Packet interface 103 for processing data of various data types. The common controller 100 also includes Pseudo-ATM cell conversion modules 104. The common controller 100 includes a cell multiplexer/de-multiplexer (MUX/DEMUX) 105 to properly collect and distribute the ATM and pseudo-ATM cells to and from the interfaces. An ATM UTOPIA interface controller 106 is included within the common controller 106 to interface the various data interfaces 101-103 with the UTOPIA interface 106.

The ATM interface 101 may include the resources necessary to send and receive ATM data via an ATM interface data stream 107. The ATM interface resources can properly read the VPI and VCI of the incoming ATM cells and enable the ATM cell to be routed to the proper slave processing unit. The ATM interface 101 may include all the necessary resources to perform operations required at the ATM layer. Generally, the ATM interface 101 will not encapsulate data into ATM cells because the data will already have been encapsulated. The ATM interface 101 may, though, have the appropriate resources to do so. The ATM interface 101 may be comprised of hardware, software, or firmware, or any combination thereof.

The PCM & Signal interface 102 may include the resources necessary to send and receive PCM and call control signaling data via a PCM Highway data stream 108. Generally, the PCM Highway data stream 108 carries a continuous bit stream of data. PCM is a digital representation of analog data such as video and voice. Call control signaling such as Channel Associated Signaling (CAS) related to the PCM data can also be carried along the PCM Highway data stream 108. The PCM & Signal interface 102, like the ATM interface 101, includes the resources to interpret the electronic signals sent over the data stream 108 and in turn properly route the data to a proper slave processing unit. In working with the Pseudo-ATM cell conversion module 104, the PCM & Signal interface 102 can encapsulate PCM and CAS data into a pseudo-ATM cell that can be transferred over the UTOPIA interface 111. In the other direction, the PCM & Signal interface 102 can rebuild a continuous bit stream of PCM and CAS data from consecutive incoming pseudo-ATM cells. Other functions can be performed by the PCM & Signal interface 102 that will be discussed further in relating to FIG. 7. Generally, the functionality of the PCM & Signal interface 102 can be accomplished with hardware, software, or firmware, or any combination thereof.

The Packet interface 103 is similar to the other data interfaces (i.e. the PCM & Signal interface 102 and the ATM interface 101) in that the appropriate resources are included in the interface 103 for transmitting and receiving data to and from a data stream, in this case a packet data stream 109. The packet data stream 109 may carry various types of packet data, such as IP, Ethernet, HDLC, etc. The packet data carried information previously encapsulated in packets that may also include navigational information incorporated within a packet header. The Packet interface 103, in conjunction with the pseudo-ATM cell conversion module 104, can encapsulate the received packet data into a proper pseudo-ATM cell for transfer over the UTOPIA interface 111. The packet interface 103 can also strip the packet data from incoming pseudo-ATM cells received from the UTOPIA interface 111. The Packet interface 103 includes the resources to properly route each packet to its proper processing unit. More functional aspects of the Packet interface 103 will be discussed in FIGS. 5 and 6. Generally, the Packet interface 103 may include hardware, software, or firmware, or any combination thereof, to provide for its functionality.

The pseudo-ATM conversion module 104, generally is software or firmware but may be hardware that can properly encapsulate data into a pseudo-ATM cell format. Specific error handling and bit stuffing operations can be performed by the data interfaces upon working with the module 104. Likewise, the pseudo-ATM conversion module 104 can work with the data interfaces to rebuild the respective data streams from the pseudo-ATM cells. The specific structures of several different pseudo-ATM cell formats will be discussed in FIG. 5-7.

Hereinafter, the term downstream will define the direction of data flow from master processing unit 100, across the UTOPIA interface 111, and to an appropriate slave processing unit. The term upstream will define the direction of data flow from a slave processing unit, across the UTOPIA interface 111, and to the appropriate data interface of the master processing unit 100. In the downstream, the cell MUX/DEMUX 105 can multiplex cells from the three data interfaces 101, 102, and 103 and provide them to the UTOPIA interface controller 106 in one complex cell stream. Various multiplexing methods are well known in the art and could be utilized by the cell MUX/DEMUX 105. In the upstream direction, the cell MUX/DEMUX 105 can de-multiplex the complex cell stream from the UTOPIA interface controller 106 to provide cells to the appropriate data interface 101, 102, or 103.

The UTOPIA interface controller 106 provides for the interface between the data interfaces 101, 102, and 103 and the UTOPIA interface 111. The UTOPIA interface controller 106 may be equipped with knowing what slave processing units are connected to the UTOPIA interface 111 and at what ports of the UTOPIA interface 111. When a cell is ready to be transmitted across the UTOPIA interface 111, the UTOPIA interface controller 106 can work with the appropriate slave processing unit's UTOPIA interface controller 124 to establish a communication channel between the two over the UTOPIA interface 111. The UTOPIA interface controller 106 may communicate with a data interface to establish the destined slave processing unit and, so in knowing the corresponding port number, can properly establish the communication channel. Typically, the establishment of the communication channel is accomplished with a handshake algorithm. For a standard ATM cell, the VPI and VCI may be read by the UTOPIA interface controller 106 and interpreted into the proper destination channel or port. For a pseudo-ATM cell, the UTOPIA interface controller 106 may be capable of recognizing a channel number or port number that is coded into the header of the corresponding cell. In general, the UTOPIA interface controller 106 is comprised of hardware as well as software and firmware.

As mentioned above, the ATM slave processing unit 120 is configured to process standard ATM data. The ATM slave processing unit 120 may include the UTOPIA interface controller 124 and an ATM physical layer interface (ATM PHY) 128 which is similar to the ATM interface 101 of the master processing unit 100. In the downstream direction, standard ATM cells may be received via the UTOPIA interface 111. The UTOPIA interface controller 124 may work with the UTOPIA interface controller 106 of the master processing unit 100 to establish a communication channel. Once established, transfer of standard ATM cells can begin. The ATM PHY 128 can properly process the data of the ATM cells into electronic signals that are to be passed across a physical device (i.e. copper line, fiber). Often, more than one ATM slave processing unit 124 may be located in the multi-media communication system 50.

In the upstream direction, standard ATM cells may be provided to the UTOPIA interface 111. Electronic signals carrying data encapsulated in standard ATM cells can be provided to the ATM PHY 128. Once interpreted by the ATM PHY 128, the UTOPIA interface controller 124 can request a communication channel with the UTOPIA interface controller 106. Once a communication channel is established, the ATM cells can be transferred over the UTOPIA interface 111 and provided to the ATM interface 101. This data can then be processed and sent out along the ATM interface data stream 107 or can be processed and provided to another ATM slave processing unit (not shown). This routing is accomplished by interpreting the VPI and VCI of each ATM cell.

The Packet slave processing unit 122 is configured to process packet data. The Packet slave processing unit 122 may include the UTOPIA interface controller 124 and a Packet physical layer interface (Packet PHY) 130 which is similar to the Packet interface 103 of the master processing unit 100. Typically, several Packet slave processing units would be included in multi-media communication system 50. Each Packet PHY 130 may be configured to process different types of packet data, such as IP, Ethernet, and HDLC. Some Packet PHYs 130 may be configured to process all three types of data, similar to the Packet interface 103. Two types of pseudo-ATM cell formats are disclosed in this document that are configured for packet data, although other formats embodying the same general configurations could be used. Certain Packet PHYs 130 may be configured to process one or both of these formats.

In the downstream direction, pseudo-ATM cells may be received via the UTOPIA interface 111. The UTOPIA interface controller 124 may work with the UTOPIA interface controller 106 of the master processing unit 100 to establish a communication channel. Once established, transfer of pseudo-ATM cells can begin. The Packet PHY 130 must reassemble the data stream of packet data prior to supplying the data to a physical medium. The packet data can be removed from the pseudo-ATM cells and proper bit-stuffing and error checking can be performed. In one example, several pseudo-ATM cells may be required to transport a single Ethernet frame. The data must be removed from the several pseudo-ATM cells and rebuilt into the Ethernet frame. The Packet PHY 130 can then properly process the packet data into electronic signals that are to be passed across a physical device (i.e. copper line, fiber).

In the upstream direction, pseudo-ATM cells may be provided to the UTOPIA interface 111. Electronic signals carrying packet data can be provided to the Packet PHY 130 from a physical medium. The Packet PHY 130 can encapsulate the packet data into successive pseudo-ATM cells. Further processing on the pseudo-ATM cells can be performed to properly set up appropriate routing information and error handling. Once interpreted by the Packet PHY 130, the UTOPIA interface controller 124 can request a communication channel with the UTOPIA interface controller 106. Once a communication channel is established, the pseudo-ATM cells can be transferred over the UTOPIA interface 111 and provided to the Packet interface 103. This data can then be processed and sent out along the Packet interface data stream 109 or can be processed and provided to another Packet slave processing unit (not shown). This routing can be accomplished by interpreting the packet data and assigning an appropriate channel number that may be mapped into the header of the pseudo-ATM cells.

The PCM slave processing unit 123 is configured to process PCM and signaling data. The PCM slave processing unit 123 may include the UTOPIA interface controller 124 and a PCM physical layer interface (PCM PHY) 131 which is similar to the PCM & Signal interface 102 of the master processing unit 100. Typically, several PCM slave processing units would be included in multi-media communication system 50. One particular pseudo-ATM cell format is disclosed in this application that can transport PCM and Signal data across the UTOPIA interface 111.

In the downstream direction, pseudo-ATM cells may be received via the UTOPIA interface 111. The UTOPIA interface controller 124 may work with the UTOPIA interface controller 106 of the master processing unit 100 to establish a communication channel. Once established, transfer of pseudo-ATM cells can begin. The PCM PHY 131 must reassemble the data stream of PCM data prior to supplying the data to a physical medium. The PCM data can be removed from the pseudo-ATM cells and proper error-checking and sequencing can be performed. The Packet PHY 130 can then properly process the PCM data into electronic signals that are to be passed across a physical device (i.e. copper line, fiber).

In the upstream direction, pseudo-ATM cells may be provided to the UTOPIA interface 111. Electronic signals carrying PCM data can be provided to the PCM PHY 131 from a physical medium. The PCM PHY 131 can encapsulate the PCM data into successive pseudo-ATM cells. Further processing on the pseudo-ATM cells can be performed to properly set up appropriate routing information. Once interpreted by the PCM PHY 131, the UTOPIA interface controller 124 can request a communication channel with the UTOPIA interface controller 106. Once a communication channel is established, the pseudo-ATM cells can be transferred over the UTOPIA interface 111 and provided to the PCM & Signal interface 102. This data can then be processed and sent out along the PCM interface data stream 108 or can be processed and provided to another PCM slave processing unit (not shown). This routing can be accomplished by interpreting the PCM data and assigning an appropriate channel number that may be mapped into the header of the pseudo-ATM cells.

As mentioned in FIG. 3, each slave processing unit may be configured to process only one type of data. In other embodiments, however, a slave processing unit can process several different data types similar to the functionality of the master processing unit 100. Slave processing unit 121 of FIG. 4 can process standard ATM data, packet data, and PCM data in much the same way as the master processing unit 100. In other embodiments, a slave processing unit may have the resources to process only two of the three.

Figure 5:
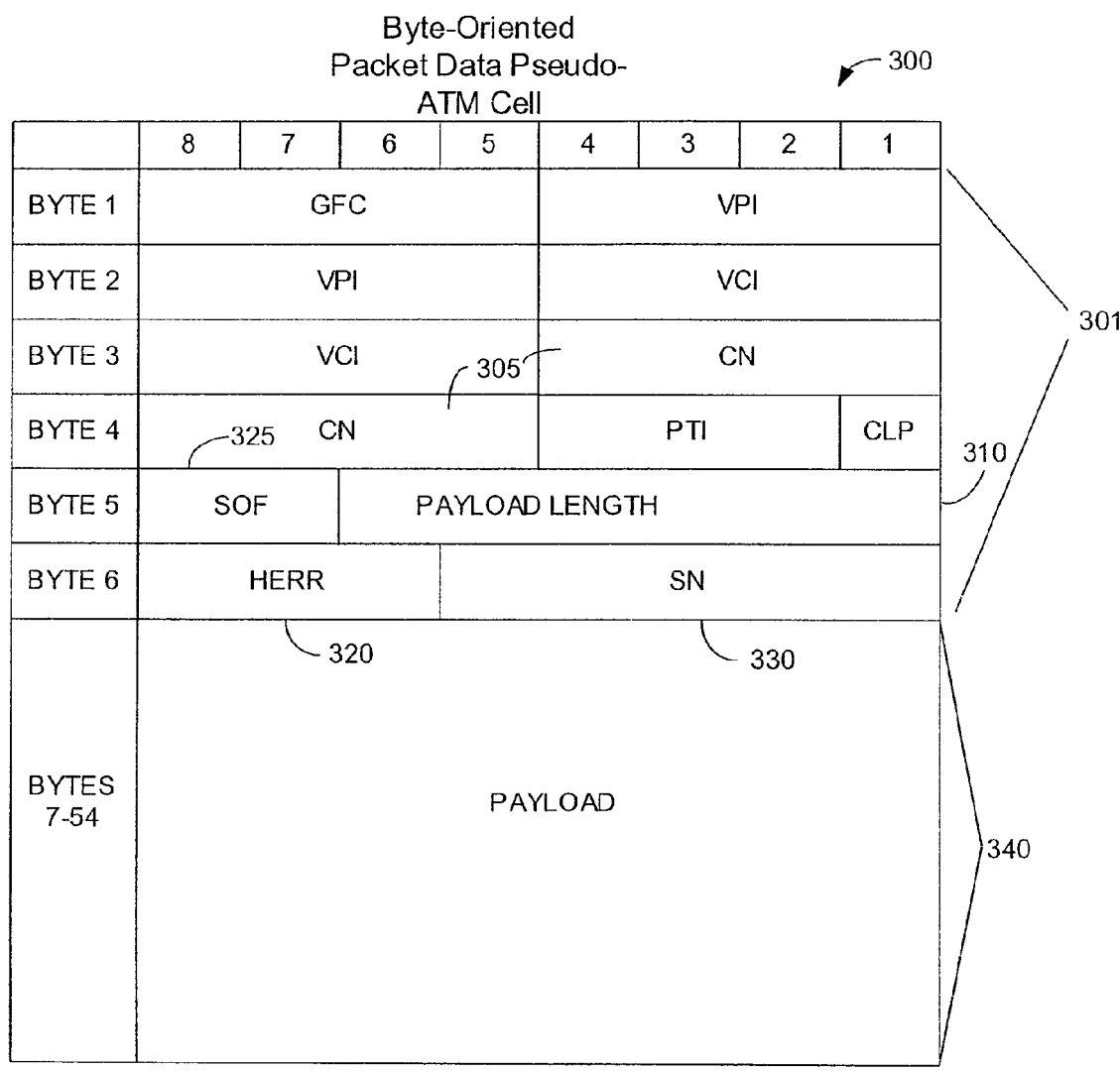
FIG. 5 is a schematic of a byte-oriented packet data pseudo-ATM cell in accordance with embodiments of the present invention.

FIG. 5 is a schematic of a byte-oriented packet data pseudo-ATM cell 300 in accordance with embodiments of the present invention. The cell 300 may be used to transfer packet data across a common data path interface, such as the UTOPIA interface 111. The Packet interface 103 and the Packet PHY 130 may be configured to encapsulate the packet data in to a cell of this format. The Packet interface 103 and the Packet PHY 130 may also be configured to reassemble or rebuild a packet frame from several cells once they have been transferred over the UTOPIA interface 111.

The cell 300 includes 54 octets or bytes—of 8 bits each. The first six bytes comprise a header 301 of the cell and the remaining bytes comprise a payload 340. Similar to the standard ATM cell 10 of FIG. 1, the header 301 contains all appropriate multi-media system 50 management information.

The VPI, PTI, and the CLP are ignored by the receiver. This is one distinguishing characteristic between the cell 300 and a standard ATM cell 10 (See FIG. 1). A Channel Number (CN) field 305 may be included within the header 301. Generally, the CN field 305 would be an 8-bit field and located, typically, where part of the VCI field would be. The remaining portion of the VCI would simply be ignored by the receiver much like the VPI and other fields. This number can be interpreted by the Packet interface 103, the Packet PHY 130, and the UTOPIA interface controllers 106 and 111, in order to establish the proper communication link and for routing purposes. The channel number may correspond to a UTOPIA port that corresponds to a particular destination processing unit.

The fifth byte of the header 301 contains a Payload Length field 310. The Payload Length field 310 indicates how many packets in the payload are filled with relevant data. If this is the last cell of the packet frame being encapsulated then the length of data remaining in the payload is noted in this field 310. For example, an IP frame or datagram typically contains more than 576 octets in length. For this example, suppose the IP frame has 600 octets. In the illustrated embodiment, thirteen cells are used to transfer this frame or packet. The first twelve cells each contain a full payload of 48 bytes. The last cell contains a payload of 24 bytes, the remaining number of octets, or bytes, in the IP frame. A binary representation of 24 can be placed in the Payload Length field 310. This can be read by the receiving processing unit and interpreted to mean that there are 24 bytes of good data in the payload, ignore the rest. If the cell is not the last cell, this field 310 should be filled with a binary. The Payload Length field 310 may be 6 bits in length and the remaining two bits of the 5$^{th}$ byte can be utilized to communicate such information as the first cell of a frame, the last cell of a frame, an intermediate cell, and an abnormal cell (in which case, the cell should be ignored). The field that can convey this information may be called the Start of Frame (SOF) field 325. Other algorithms for communicating the end of data could be utilized as well and those described herein are not intended to be limiting examples.

The header 301 includes a HDLC error (HERR) field 320. This field may be utilized to communicate packet error detected upon segmentation and encapsulation of the data into the cell 300. This field is mainly utilized in the upstream direction. Oftentimes, when a slave processing unit receives packet data from a physical medium, errors may result. These errors should be recognized and communicated to the master processing unit so that proper steps can be taken. For example, the packet data may be accompanied with a Cyclic Redundancy Code (CRC) for error checking. If the CRC is not correct, an error may have occurred on the packet data. Another example is if the frame is too long or too short. Table 1 shows various values in the 3-bit HERR field 320 and what they may signify.

TABLE 1

HERR Field values and their interpretation.

| Value | Interpretation |
|---|---|
| 000 | No packet error |
| 001 | CRC error, if so equipped |
| 010 | Frame is too short |
| 011 | Frame is too long |
| 100 | Non-byte oriented data |
| 101 | Reserved |
| 110 | Reserved |
| 111 | Packet data abort |

These are non-limiting examples of interpreted errors that may be communicated to the master processing unit 100. A cell marked with an error may be sent to the master processing unit 100 with the erred data in the payload 340. In this case, the cell should be marked as the last cell; i.e. the Payload Length field 310 should be non-zero. Upon receiving the erred data with the appropriate HERR field value, the master processing unit 100 may alert the system of an error. The master processing unit 100 may also use the HERR field 320 to keep statistics on erred data. This field is typically set to zero in the downstream direction of data flow.

The header 301 includes a Sequence Number (SN) field 330. This field may be used to keep track of cell sequencing and cell drop in the transfer of the cells from one processing unit to another. Suppose a frame of 2000 bytes or octets. This would require 42 pseudo-ATM cells 300, 41 of which are completely filled, and the last one with 32 bytes in the payload 340. As this frame is segmented and encapsulated the sending processing unit may number each cell in sequence so that at the receive end, a processing unit may reconstruct the frame in its proper order. Each cell is given a sequence number. The first cell of a frame is given an sequence number of 0 and so the SN field 330 is field is filled with a binary 0. The next cell is SN=1, the next SN=2, and so on until cell 33 which is given SN=0. The SN field 330 is modulo 32 (a five-bit field) so every 33$^{rd}$ cell restarts the numbering sequence. If a cell is dropped upon transfer, the receiving processing unit may detect this by checking the SN field 330 of the last cell of the frame against an internal sequence counter. The receiving processing unit may then disregard all the cells of that frame. The value of the SN field 330 would be re-initialized back to zero when the SOF field 325 signifies the start of a new frame. Subsequently, the receiving processing unit's internal sequence counter will be re-initialized.

The payload 340 contains the packet data that could be any data that is byte-oriented, such as a byte-oriented packet frame. Error checking of the packet data may be included in the payload, such as a Checksum or a CRC error check. As mentioned, each cell should be filled with 48 bytes of data except for the last cell of a frame. In this case, the unused portion of the payload may be padded with a flag pattern.

The cell 300, as mentioned, is 54 bytes in length. The standard ATM cell is 53 bytes in length. The UTOPIA interface typically transfers an even number of bytes for every cell transmitted. So, 54 bytes are typically transferred for every standard ATM cell transmitted. The byte-oriented pseudo-ATM cell 300 complies with the UTOPIA interface standard. In other embodiments, if another type of common data path interface 110 was utilized, the length of the cell 300 could be extended to comply with the standard of the common data path interface 110 is use. Typically, the payload 340 would be extended, which could allow for more data to be transmitted for each cell.

Figure 6:
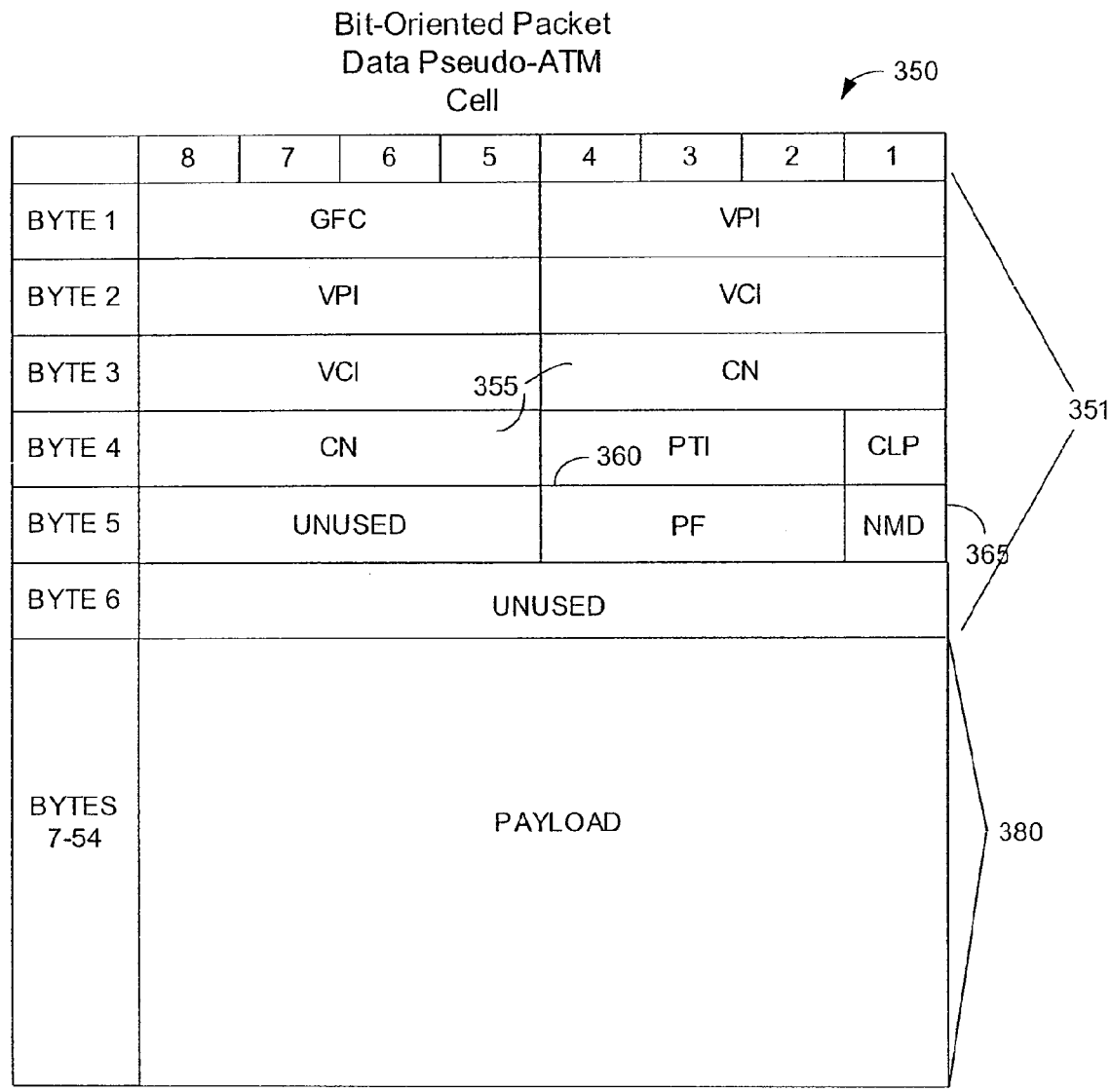
FIG. 6 is a schematic of a bit-oriented packet data pseudo-ATM cell in accordance with embodiments of the present invention.

FIG. 6 is a schematic of a bit-oriented packet data pseudo-ATM cell 350 in accordance with embodiments of the present invention. The cell 350 may be used to transfer packet data across a common data path interface, such as the UTOPIA interface 111. The Packet interface 103 and the Packet PHY 130 may be configured to encapsulate the packet data in to a cell of this format. The Packet interface 103 and the Packet PHY 130 may also be configured to reassemble or rebuild a packet frame from several cells once they have been transferred over the UTOPIA interface 111. In general, the sending processing unit may receive a data stream of continuous bits. The continuous bits may make up successive frames or packets of data separated by buffer bits. Typically, the start of a packet is signified with an opening flag and ends with a closing flag. Another flag pattern acts as a buffer between two successive frames. A commonly used flag pattern is "01111110." The sending processing unit receives the continuous bit stream, segments and encapsulates the data bits into cells, and upon transfer of the cells, a receiving processing unit reassembles the data bit from the cells into the continuous bit stream.

The cell 350 includes 54 octets or bytes—of 8 bits each. The first six bytes comprise a header 351 of the cell and the remaining bytes comprise a payload 380. Similar to the byte-oriented packet data pseudo-ATM cell 300 of FIG. 5, the GFC, VPI, PTI, and CLP are ignored by the receiver. A Channel Number (CN) field 355 that maps the cell to a packet channel number may be included in the header 351. As mentioned above, the CN field 355 would, typically, be located where part of the VCI field was located. The remaining portion of the VCI would be ignored by the receiver. This number can be interpreted by the Packet interface 103, the Packet PHY 130, and the UTOPIA interface controllers 106 and 111, in order to establish the proper communication link and for routing purposes. The channel number may correspond to a UTOPIA port that corresponds to a particular destination processing unit.

A No-More-Data (NMD) field 365 is included in the header 351 and is used to communicate that the current cell is the last cell of a packet stream. Several packets or frames may be transferred over the common data path interface 110 across several cells. The stream of packets is made up of the continuous bit stream with the flag pattern separating two successive packets. Partial content of one packet may be included within the same cell as partial contents of another cell, the contents being separated by the flag pattern. The sending processing unit may recognize the end of packet data and signal to the receiving processing unit that the current cell 350 is the last cell containing packet data in the packet stream. The receiving processing unit, upon completing the reassembly of the relevant packet data bit stream, can then begin sending an IDLE flag pattern along in the bit stream. A commonly used IDLE flag pattern is "01111110" as well as successive data 1's. The particular pattern is not critical and depends on how the entire system is configured. The receiving processing unit will continue to send the IDLE flag pattern until it again starts receiving cells of data from the sending processing unit.

A Partial Flag (PF) field 360 is a 3-bit field used to help the receiving processing unit properly recognize the end of the relevant data in the payload 380 of a transferred cell 350. The value of the PF field 360 is a binary representation of the number of partial flag bits in the last octet of the payload 380. The PF field 360 is interpreted only when the NMD field 365 signifies the current cell contains the end of relevant data. If not, the PF field 360 may be ignored by the receiving processing unit. The PF field 360 can best be understood within the context of an example. Suppose a bit-oriented packet with a size of 8003 bits is to be transferred across the multi-media communication system 50. 21 bit-oriented packet data pseudo-ATM cells 350 would be required. The first 20 cells 350 would have payloads 380 completely filled to 48×8 =384 bits and the $21^{st}$ cell would have 323 bits of relevant data. The remaining 61 bits of the payload 380 would be filled up by the sending processing unit with the IDLE flag pattern. The first 40 bytes of the $21^{st}$ cell would be filled with relevant data. The $41^{st}$ byte would then be "ddd01111" (d is for a relevant data bit). The last octet of the payload 380 would then be "1100111." In this case, the PF field 360 would be given a binary value representing 5, signifying that 5 bits of the IDLE flag pattern are present in the same byte or octet as the end of the relevant data. The receiving processing unit can then continue on generation of the IDLE flag pattern from where the sending processing unit left off.

The payload 380 may contain any bit-oriented data and is always completely filled to 48 bytes except for the last cell required for a given packet stream. In this case, all relevant data is incorporated into the payload 380 of the last cell 350 and the remaining portion of the payload 380 is filled with the IDLE flag pattern. The data stored in the payload 380 may contain a Checksum or a CRC of the data and also may be bit-stuffed. Bit stuffing is a well known technique for distinguishing relevant packet data that appears similar to a flag pattern. For example, the HDLC bit-stuffing protocol is a well known protocol that masks relevant data that appears to be similar to the flag pattern. The sending processing unit may be configured to perform a bit-stuffing operation.

Similar to the cell 300 discussed in FIG. 5, cell 350 may be expanded or reduced to any length that complies with the utilized data path interface. Typically, the payload 380 could be expanded or reduced to comply with the size of the cell 350.

Figure 7:
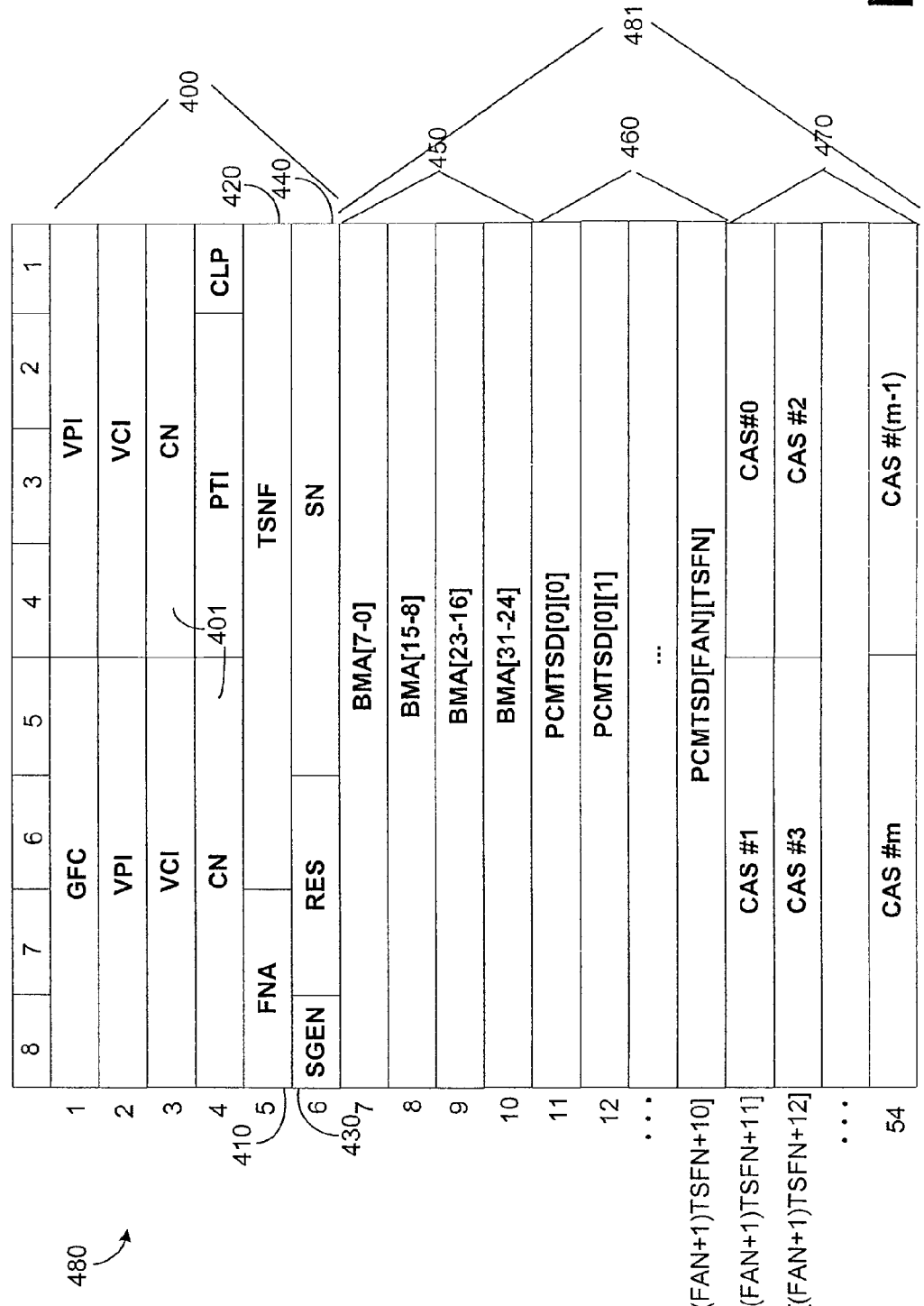
FIG. 7 is a schematic of a voice data pseudo-ATM cell in accordance with embodiments of the present invention.

Turning now to FIG. 7, a third cell format is described. FIG. 7 is a schematic of a voice data pseudo-ATM cell 480 in accordance with embodiments of the present invention. PCM is a well known digital modulation scheme for transmitting analog data. The signals in PCM are binary no matter how complex the analog waveform happens to be. Using PCM, it is possible to digitize all forms of analog data, including full-motion video, voices, music, telemetry, and virtual reality (VR). Typically, analog signals are sampled 8000 times per second. This may vary though depending on the how a system is configured. Today, most PCM systems quantize each sample with 8 bits, therefore producing 256 different quantization levels. Typically, several channels are multiplexed onto one line. A PCM frame contains one sample of each channel on a line. So, a 16-channel system contains 16 bytes of relevant data per frame, each byte is called a time slot. Signaling information may accompany the relevant data within the frame as well as a header and a trailer. 8000 frames are communicated every second. The cell 480 is a "vehicle" for transferring frames across the common data path interface 110, in particular, the UTOPIA interface 111. As mentioned above, PCM is utilized in the preferred embodiments but it should be noted that other technologies well known in the art for communicating voice data could be used.

The cell 480 includes 54 octets or bytes—of 8 bits each. The first six bytes comprise a header 400 of the cell 480 and the remaining bytes comprise a payload 481. Similar to the byte-oriented packet data pseudo-ATM cell 300 of FIG. 5, the GFC, VPI, PTI, and the CLP are ignored by the receiver. A Channel Number (CN) field 401 that maps the cell to a channel or port number may be included within the header 400. This field 401 can be interpreted by the PCM & Signal interface 102, the PCM PHY 131, and the UTOPIA interface controllers 106 and 111, in order to establish the proper communication link and for routing purposes. The channel number may correspond to a UTOPIA port that corresponds to a particular destination processing unit.

A Frame per pseudo-ATM Cell (FNA) field 410 is included in the header 400 to communicate, from the sending processing unit to the receiving processing unit, the number of PCM frames included in this particular cell. In this embodiment, the FNA field 410 is a 2-bit field, so a maximum count of 4 frames/cell can be communicated. The number of frames per cell can vary which allows the flexibility of various UTOPIA rates. For example, an 8-channel frame may be transferred in each cell 480 at a UTOPIA rate of 8000 cells/sec or once every 0.125 msec. This is equivalent to 2 8-channel frames per cell 480 transferred across the UTOPIA interface 111 once every 0.25 msec or 4000 cell/sec. As mentioned, this allows for flexibility in the transfer rate of the UTOPIA interface 111 while maintaining the same data transfer rate.

A Time Slot per Frame (TSNF) field 420 is included in the header 400 to communicate how many time slots, or channels are present in each frame. The number of channels in each frame will generally depend on the number of lines that are configured. For example, suppose the system 50 was located in the DSLAM 20 (See FIG. 2) and there were 8 DSL lines 23 coupled to the DSLAM 20. For the purpose of this example, each DSL line 23 may be considered a channel although several voice channels can exist on one DSL line 13. A single PCM PHY 131 may be configured to receive all 8 lines 23 and perform the PCM sampling of each channel. In general, the number of channels, and therefore the number of time slots in each frame may vary depending on how many lines are connected as well as the particular PCM application. For example, a standard T1 line generally carries 24 voice or data channels, whereas an E1 line generally carries 30 voice or data channels. The total number of bytes that are placed in the cell 480 is equal to the product of the number of frames in the cell (FNA field 410) and the number of time slots in each frame (TSNF field 420). In this embodiment, the total number of bytes of PCM data may not exceed 29, when carrying signaling data. When not carrying signaling data, the local number of voice data bytes may be 44. In other embodiments, these numbers may vary with the size of the cell. For example, the UTOPIA interface 11 may be configured to transfer 64 byte cells. In this case, the total size of voice data bytes may be 32 and 54, respectively. This allows for space in the payload 481 to be used for bit masking and signaling data (to be discussed shortly).

A Signal Enable (SGEN) field 430 is included in the header 400 to communicate whether the payload 481 contains Channel Associated Signaling (CAS) information. CAS is signaling in which control signals, such as those for indicating the status of the cell are carried in the same channels along with the voice and data signals. This arrangement is an alternative to CCS (common channel signaling) in which a group of voice-and-data channels share a separate channel that is used only for control signals. The SGEN field 430 can signify if CAS data is carried in the payload or not. Typically, the SGEN field 430 is a one-bit field.

Similar to the packet data pseudo-ATM cell 300, a Sequence Number (SN) field 440 is included in the header 400. This field may be used to keep track of cell sequencing and cell drop in the transfer of the cells from one processing unit to another. This helps keep a continuous PCM data stream in its proper order. If a cell is dropped upon transfer, the SN field 440 could reflect this and proper action may be taken by the receiving processing unit, such as sending an error flag to the system and/or disregarding the frame. In this embodiment, the Sequence Number field 440 is a five-bit field so 32 binary values can be conveyed. The Sequence Number field 440 restarts at zero after every $32^{nd}$ cell.

The payload 481 contains PCM data 460 and may contain the CAS signaling data 470. A Bit Mask of Active time slots (BMA) field 450 is included in the payload 481 to communicate which channels, and therefore, which time slots are active. Each bit of the BMA field 450 may represent one channel. A data '1' may represent that that channel is active, whereas a data '0' may represent that that channel is inactive.

The PCM data 460, as discussed above, is the actual time slots for each frame. The length of the PCM data 460 may vary with the number of frames in the cell 480 and the number of time slots in each frame.

CAS stands for Channel Associated Signaling. This is information about a PCM voice channel that indicates the state of the voice channel (on-hook, off-hook, etc.) In standard telephony this is represented as a 4-bit nibble. In general, the CAS patterns are carried, two per byte, in a CAS field 470 of the cell 480. The actual number of bytes carrying CAS information depends upon the value stored in the TSNF field 420. If TSNF is odd—the number of bytes of CAS information will be [(TSNF/2)+1]. If TSNF is even—the number of bytes of CAS information will be [TSNF/2]. The unused bytes in the remainder of the cell are padded with 0xFF.

An example system 50 and various pseudo-ATM cell formats having been described above, operation of the system 50 will now be discussed. In the discussion that follows, a flow chart is provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 8:
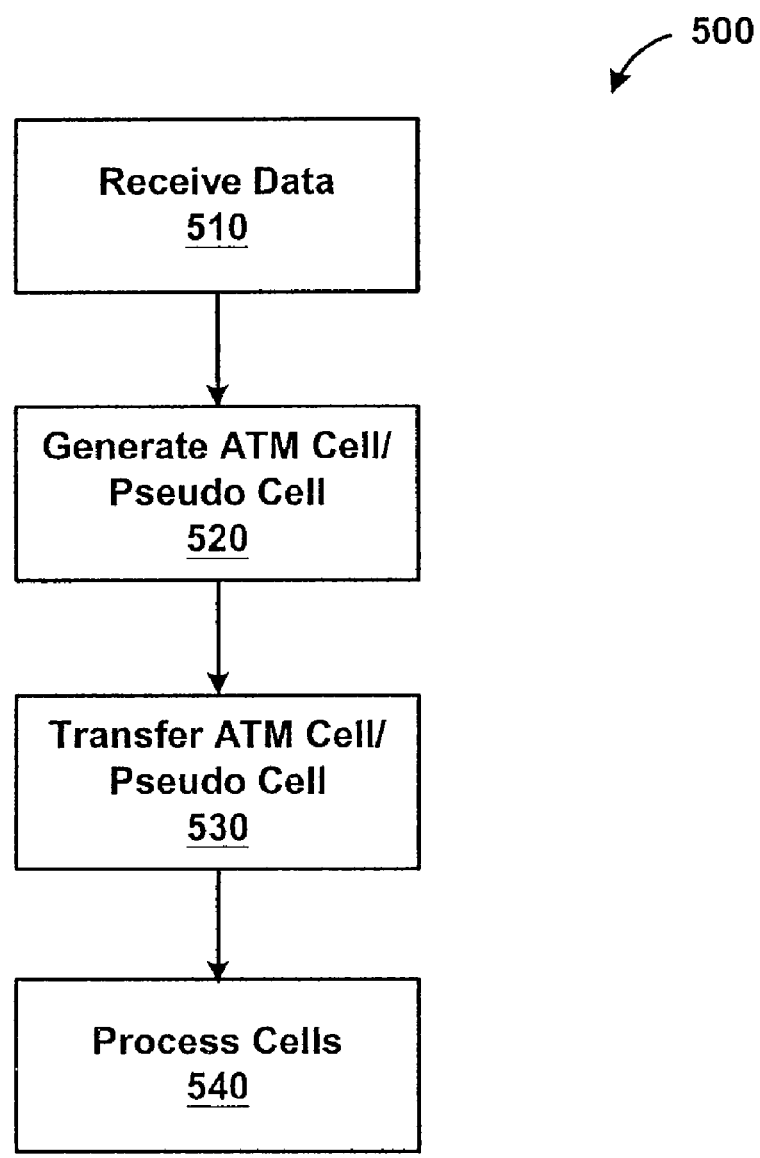
FIG. 8 is a flow chart illustrating a method for providing for the transfer of data of various data types across a common data path interface in accordance with embodiments of the present invention.

FIG. 8 is a flow chart illustrating a method 500 for providing for the transfer of data of various data types across a common data path interface in accordance with embodiments of the present invention. The method 500 may be performed by the multi-media communication system 50 as discussed in FIGS. 3 and 4. The method 500 begins when data of various data types is received by a sending processing unit (step 510). In the downstream direction, the master processing unit 100 may be the sending processing unit. In the upstream direction, the slave processing units 120-123 may receive the data. The specific data types received by each processing unit may vary with how each processing unit is configured. The data may be received from a foreign device or may originate from another component of the system in which the multi-media communication system 50 subsides. Appropriate interfaces may be included in the sending processing unit to process the received information. Interfaces such as ATM interface 101, PCM & Signal interface 102, Packet interface 103, ATM PHY 128, PCM PHY 131, Packet PHY 130, or any combination thereof, such as PHY 129, may have the necessary resources to receive and process the data of the various data types.

The next step is to generate the cells (step 520). A non-limiting list of cells may be ATM cells 10, byte-oriented packet data pseudo-ATM cells 300, bit-oriented packet data pseudo-ATM cells 350, and PCM data pseudo-ATM cells 480. Different resources may required to generate the different cells. Each cell may pertain to the particular data type that has been received. For example, Packet interface 103 may receive packet data such as IP, Ethernet, and HDLC, among other types of packet data. IP and Ethernet data, generally, are byte-oriented and HDLC is generally bit-oriented. Packet interface 103, as well as Packet PHY 130 may have the necessary resources to process and generate the appropriate cells. This step 520 will be discussed in further detail to in FIG. 9A.

Once the cells are generated, they may be placed on the common data path interface 110 and transferred to the appropriate recipient processing unit (step 530). Each cell may be mapped to a particular processing unit by channel number, or UTOPIA port number. The derivation of the channel number or port may vary with the cell format. For example, in ATM, the VPI and the VCI are interpreted to properly route the cell to the appropriate recipient processing unit. The pseudo-ATM cells 300, 350, and 480 utilize a channel number field to address the cell to the appropriate recipient processing unit. Typically, a handshake is made between sending and receiving processing units prior to the start of communication of a stream of cells. Once a handshake is made, the cells are transferred.

Finally, upon receiving the cells from the common data path interface, the cells may be properly processed for output from the system 50 (step 540). The processing of the cells may vary as to the particular cell format. For example, the standard ATM cells may be passed along through a physical medium in their original format. A continuous bit stream of bit-oriented data, such as HDLC data, may be reassembled from bit-oriented pseudo-ATM cells 350 and placed on a physical medium. The data may also be reassembled and provided to another component in the overall system in which the system 50 resides. In this case, preparing the data for transmission over a physical layer may not be necessary. Error checking or bit de-stuffing may be performed at this point as well. In the downstream direction, the slave processing units 120-123 may perform the processing. In the upstream direction, the master processing unit 100 may perform the processing. This step will be discussed in further detail in FIG. 9B.

Figures 9A, 9B:
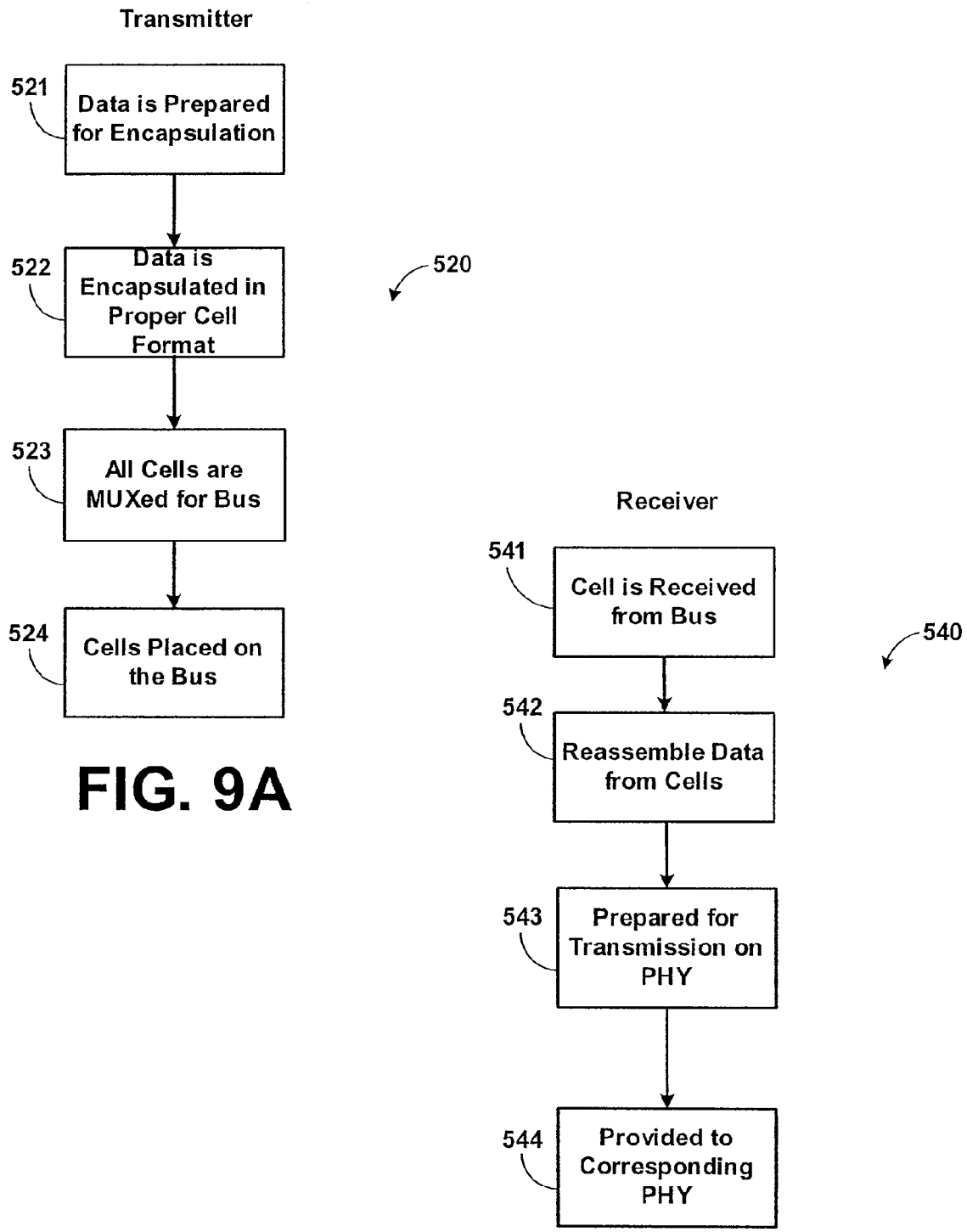
FIG. 9A is a flow chart illustrating a method for preparing cells for transfer across a common data path interface in accordance with embodiments of the present invention.
FIG. 9B is a flow chart illustrating a method for receiving cells from a common data path interface in accordance with embodiments of the present invention.

FIG. 9A is a flow chart illustrating a method 520 for preparing cells for transfer across a common data path interface in accordance with embodiments of the present invention. The method 520 begins once data has been received by the sending or transmitting processing unit. The data is first prepared for encapsulation (step 521). Proper interpretation of the data may be performed here to determine the particular cell format as well as segmenting the data. Proper bit stuffing and error checking may be performed prior to encapsulating the data. This generally would be performed by a data interface 101-103 or a PHY 128-131.

Once the data is prepared and interpreted, it may be encapsulated (step 522). Upon interpreting the data, the header field values may be determined and imported into the newly encapsulated header.

The cells from the various data interfaces are then MUXed together (step 523). This step would be avoided if only one data interface was present in a processing unit. The specific multiplexing algorithm may vary. Several multiplexing algorithms are well known in the art.

Once the cells have been MUXed, they can then be placed on the common data path interface 110 or bus (step 524).

The method 520 generally discusses the generation of new cells. For ATM data that has already been encapsulated, this method 520 is somewhat altered. Generally, each cell is interpreted and proper routing information is updated in each header. The cells are then passed along to the bus. The cells do not get encapsulated, as they are already encapsulated.

FIG. 9B is a flow chart illustrating a method 540 for processing cells received from a common data path interface 110 in accordance with embodiments of the present invention. The method begins when a cell is received from the common data path interface (or bus) 110 in step 541. This is generally accomplished by the ATM UTOPIA interface controller 106 or 124. The controller 106 or 124 then passes the cell along to the appropriate interface. De-multiplexing may be necessary at this point if more than one interface is present at the receiving processing unit. This supplemental step has not been shown in FIG. 9B.

The payload of each cell is then removed and the header is discarded. The data from the payload can then be used to rebuild the originally encapsulated data (step 542). Appropriate bit streams can be reassembled in their proper order. Error handling and bit stuffing may be performed at this point if the necessary resources are available. Generally, this step could be avoided if the cells, in particular the standard ATM cells, are to be communicated over a physical medium.

In the downstream direction, the data can then be prepared for transmission (step 543). This may require preparing for transmission over a physical medium or to another component within the system that the multi-media communication system 50 resides. Proper interfacing with the resources that generate the electronic signals is involved in preparing the data. The method 540 terminates with providing the data to the appropriate output medium (step 544).

It should be emphasized that the above-described embodiments of the present invention, particularly, any "preferred" embodiments, are merely possible examples of implementations set forth for a clear understanding of the principles of the invention. Many variations and modifications may be made to the above-described embodiment(s) of the invention, such as the particular data type that is transferred and the basic structure of each disclosed cell header, without departing substantially from the spirit and principles of the invention. All such modifications and variations are intended to be included herein within the scope of the present invention and protected by the following claims.

The invention claimed is:

1. A communications system comprising:
   at least one processing unit comprising semiconductor logic configured to transmit and received a data cell comprising:
   a payload portion for storing the packet data, the data being byte-oriented;
   a header portion comprising:
   a length field for indicating the amount of packet data stored in the payload portion;
   a Start of Frame field for indicating whether the data cell is first or last of a packet frame;
   a sequence number field for sequentially numbering the data cell with respect to other data cells in the packet frame;
   an error detection field for communicating errors, wherein the errors are detected in the packet data stored in the payload portion; and
   a mapping field for mapping the data cell to a packet channel number.

2. The communications system of claim 1, wherein the packet data comprises Cyclic Redundancy Checking (CRC) error checking data.

3. The communications system of claim 1, wherein the data cell can be transferred over an Asynchronous Transfer Mode (ATM) data path interface.

4. The communications system of claim 3, wherein the data path interface is a Universal Test & Operations PHY Interface for ATM (UTOPIA) data path interface.

5. The communications system of claim 1, wherein the length field identifies length of packet data in the payload portion upon identifying that the data cell is the last cell of the packet frame.

6. The communications system of claim 1, wherein the sequence number field can be evaluated for missing cells in the packet frame.

7. The communications system of claim 6, wherein the sequence number field can be evaluated for out of sequence cells.

8. The communications system of claim 1, wherein the sequence number field can be evaluated for out of sequence cells.

9. The communications system of claim 1, wherein the packet data may be of any of the following data types: Internet Protocol (IP) packet data, High-level Data Link Control (HDLC) packet data, or Ethernet packet data.

10. A communications system comprising:
    at least one processing unit comprising semiconductor logic configured to transmit and received a data cell comprising:
    a payload portion for storing data, the data being voice data;
    a header portion comprising:
    a mapping field for mapping the data cell to a physical layer port;
    a sequence number field for sequentially numbering the data cell with respect to other cells;
    a frame amount field for defining the number of frames of voice data stored in the payload portion; and
    a time slot amount field for defining a number of time slots per frame stored in the payload.

11. The communications system of claim 10, wherein the data stored in the payload portion further comprises signaling data and wherein the header portion of the data cell further comprises a signal enable field for signifying whether the data cell is carrying signaling data.

12. The communications system of claim 10, wherein the header portion of the data cell further comprises a bit masking field for defining which time slots of the voice data are enabled.

13. The communications system of claim 10, wherein the data cell can be transferred over an Asynchronous Transfer Mode (ATM) data path interface.

14. The communications system of claim 13, wherein the data path interface is a Universal Test & Operations PHY Interface for ATM (UTOPIA) data path interface.

15. The communications system of claim 10, wherein the sequence number field can be evaluated for missing cells in the packet frame.

16. The communications system of claim 15, wherein the sequence number field can be evaluated for out of sequence cells.

17. The communications system of claim 10, wherein the voice data is a Pulse Code Modulation (PCM) data.

18. A communications system comprising:
    at least one processing unit comprising semiconductor logic configured to transmit and received a data cell comprising:
    a payload portion for storing the packet data, the data being bit-oriented;
    a header portion comprising:
    an end-of-data field for indicating an end of data for a channel;
    a partial flag field for properly completing an incomplete byte with a portion of a predetermined flag pattern; and
    a mapping field for mapping the data cell to a packet channel number.

19. The communications system of claim 18, wherein the partial flag field is utilized to complete an incomplete byte upon the end-of-data field indicating the end of data for the channel.

20. The communications system of claim 18, wherein upon reaching end of data for the channel, a remaining portion of the payload portion is filled with the predetermined flag pattern.

21. The communications system of claim 18, wherein the data cell can be transferred over an Asynchronous Transfer Mode (ATM) data path interface.

22. The communications system of claim 21, wherein the data path interface is a Universal Test & Operations PHY Interface for ATM (UTOPIA) data path interface.

23. The communications system of claim 18, wherein the packet data may be of any of the following data types: Internet Protocol (IP) packet data, High-level Data Link Control (HDLC) packet data, or Ethernet packet data.

* * * * *

UNITED STATES PATENT AND TRADEMARK OFFICE
CERTIFICATE OF CORRECTION

PATENT NO. : 7,254,134 B2
APPLICATION NO. : 11/534760
DATED : August 7, 2007
INVENTOR(S) : Lin et al.

It is certified that error appears in the above-identified patent and that said Letters Patent is hereby corrected as shown below:

Title Page; item (75);
"Pramrod Kaluskar" should read as --Pramod Kaluskar--.

Signed and Sealed this

Thirtieth Day of October, 2007

JON W. DUDAS
*Director of the United States Patent and Trademark Office*